United States Patent [19]

Bonanos

[11] Patent Number: 5,079,532
[45] Date of Patent: Jan. 7, 1992

[54] TOROIDAL MAGNETIC DETECTOR FOR HIGH RESOLUTION MEASUREMENT OF MUON MOMENTA

[75] Inventor: Peter Bonanos, East Brunswick, N.J.

[73] Assignee: The United States of America as represented by the United States Department of Energy, Washington, D.C.

[21] Appl. No.: 620,128

[22] Filed: Nov. 30, 1990

[51] Int. Cl.$^5$ .................. H01H 1/00; H01F 27/28; G21B 1/00; G21J 1/00
[52] U.S. Cl. .................. 335/213; 335/210; 336/208; 336/229; 328/233; 376/107; 376/150; 376/153
[58] Field of Search ............ 335/210, 213, 299, 297, 335/216; 336/208, 229; 328/233, 235; 376/107, 110, 150, 153, 154, 918, 913; 324/309

[56] References Cited

U.S. PATENT DOCUMENTS 4,795,605  1/1989  Fukunaga ..................... 335/216

Primary Examiner—Leo P. Picard
Assistant Examiner—Ramon M. Barrera
Attorney, Agent, or Firm—Helen S. Cordell; John M. Albrecht; William R. Moser

[57] ABSTRACT

A muon detector system including central and end air-core superconducting toroids and muon detectors enclosing a central calorimeter/detector. Muon detectors are positioned outside of toroids and all muon trajectory measurements are made in a nonmagnetic environment. Internal support for each magnet structure is provided by sheets, located at frequent and regularly spaced azimuthal planes, which interconnect the structural walls of the toroidal magnets. In a preferred embodiment, the shape of the toroidal magnet volume is adjusted to provide constant resolution over a wide range of rapidity.

4 Claims, 2 Drawing Sheets

TOROIDAL MAGNETIC DETECTOR FOR HIGH RESOLUTION MEASUREMENT OF MUON MOMENTA

CONTRACTUAL ORIGIN OF THE INVENTION

The United States Government has rights in this invention pursuant to Contract No. DE-AC02-76CH03073 between the U.S. Department of Energy and Princeton University.

BACKGROUND OF THE INVENTION

This invention relates to muon detector systems for collider experiments, and in particular to systems of toroidal magnets which enclose central calorimetric detectors for measurement of momenta of muons produced by proton-proton collisions in a high energy accelerator.

A muon detector system for the Superconducting Super Collider (SSC) must trigger on and then precisely measure momenta of muons in single and multiple muon events over the full acceptance with resolution similar to that for measuring electrons with calorimetry. Current designs for the SSC envision a calorimeter nominally 6 m in diameter and 15 m in length, surrounded by a magnetic field volume with a bending power of 4 T-m, which will necessitate construction of magnets larger than any previously built.

In plasma confinement fusion research programs, superconducting air-core toroidal magnets are used. If a toroidal design is to be used for the SSC, the overall magnet structure must permit support of massive central detector and also support radial and axial loads arising from the Lorentz forces.

It is therefore a primary object of the present invention to provide a superconducting air-core toroidal magnet which provides the necessary 4 T-m bending power as well as high resolution measurement of muon momenta over a large rapidity range.

In the accomplishment of the foregoing object, it is another important object of this invention to provide air-core toroids which permit high resolution measurement by minimizing material thickness (radiation lengths) during the refractive process.

It is another important object of this invention to provide a muon detector system which achieves precise measurement of muon momenta for any ray emanating from the collision point by providing constant resolution over a wide range of rapidity.

Additional objects, advantages and novel features of the invention will become apparent to those skilled in the art upon examination of the following and by practice of the invention.

SUMMARY OF THE INVENTION

To achieve the foregoing and other objects, this invention comprises a muon detector system including central and end air-core superconducting toroids and muon detectors enclosing a central calorimeter/detector. Muon detectors are positioned outside of toroids and all muon trajectory measurements are made in a nonmagnetic environment. Internal support for each magnet structure is provided by sheets, located at frequent and regularly spaced azimuthal planes, which interconnect the structural walls of the toroidal magnets.

In a preferred embodiment, the shape of the toroidal magnet volume is adjusted to provide constant resolution over a wide range of rapidity.

BRIEF DESCRIPTION OF THE DRAWINGS

The present invention is illustrated in the accompanying drawings where.

DETAILED DESCRIPTION OF THE INVENTION

Figure 1:
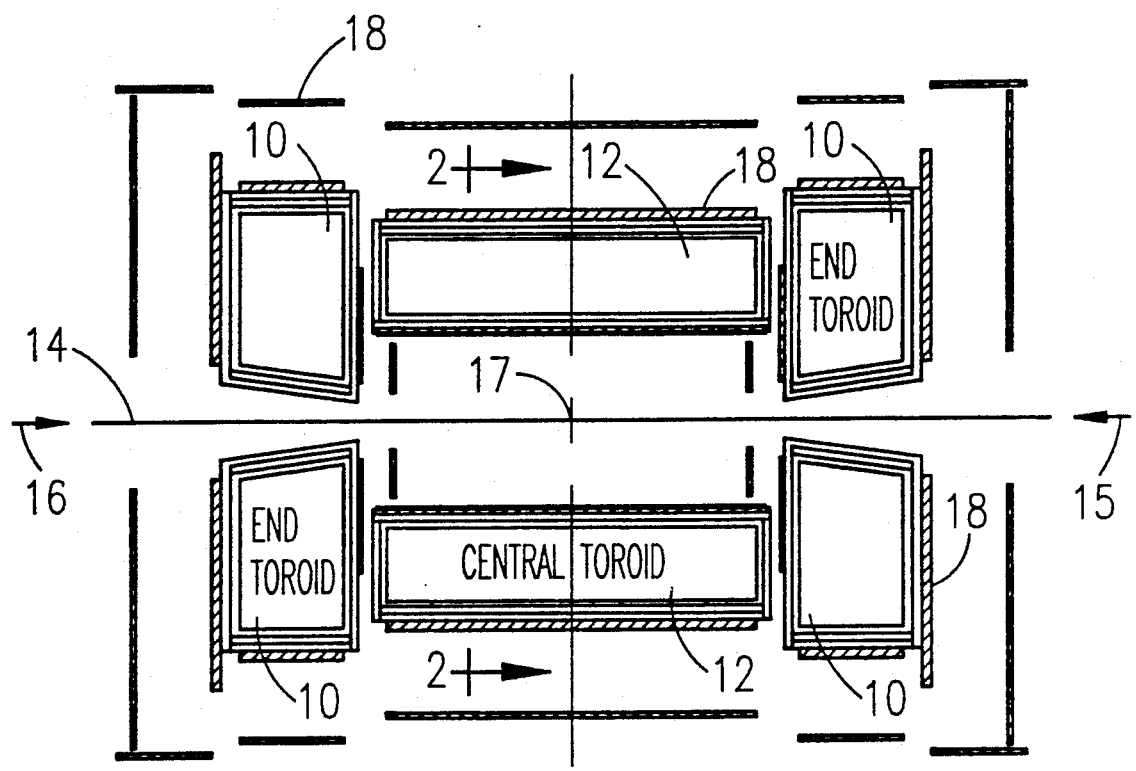
FIG. 1 shows a section of the muon detector system including the arrangement of central and end air-core toroids and muon detectors.

The system of toroidal magnets depicted in FIG. 1 includes end toroids 10 and central toroid 12 enclosing a central calorimeter (not shown). End toroids 10 and central toroid 12, are wound with the superconductor NbTi and enclosed in a forced-cooling system, well known in the prior art. Proton beams of very high energy ($2 \times 20$ Tev) traveling along beam line 14 in the directions of arrows 15 and 16 are made to collide at intersection point 17. The collision produces a variety of particles which travel along numerous paths having radial and/or axial components emanating from or very near intersection point 17. Muons and neutrinos penetrate detectors 18 (shown in FIG. 1 with hatched fill).

As a muon passes through matter its trajectory is altered slightly (a process called multiple scattering). As is known in the prior art, accuracy in measurement of particle trajectory is improved by increasing the strength of the magnetic field, and hence, curvature of the trajectory, and by reducing the thickness and atomic charge number Z of materials encountered.

The structural goal of the present invention is to achieve a design that does not exceed more than a few radiation lengths in the combined dewar, support structure, and superconductor thicknesses while achieving peak surface magnetic fields for end toroids 10 and central toroid 12 of 4.5 T and 1.5 T, respectively. This would imply total thicknesses including support structure in the range of 20 to 30 cm of aluminum equivalent and would result in muon momentum resolution of better than 3% at low momentum over almost the full rapidity range.

Figure 2:
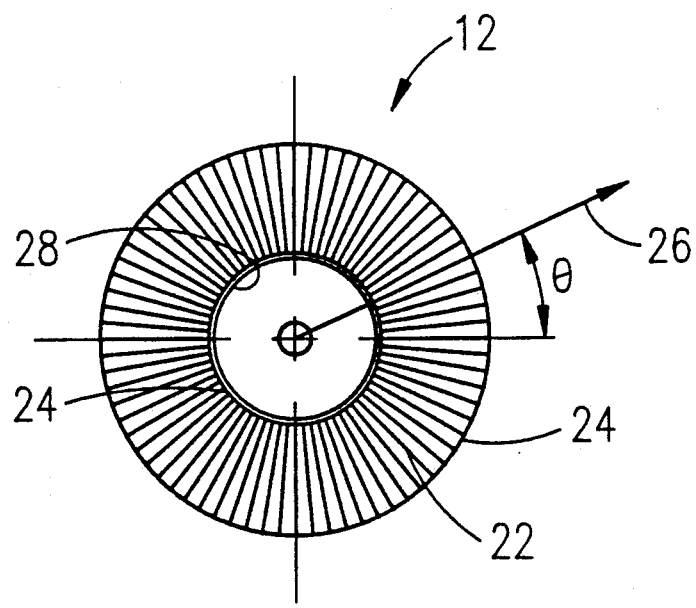
FIG. 2 is a cross-section taken along lines 2—2' of FIG. 1 showing the array of structural sheets or vanes interconnecting the walls of a toroidal magnet.

Structure for each toroidal coil must support Lorentz forces on the coil which are directed everywhere outward from the magnetic field volume. As depicted in FIG. 2, support is provided by sheet structures or vanes 22 located at frequent and regularly spaced azimuthal planes which interconnect the coil's structural walls 24. The free span of walls 24 is reduced to the space between vanes 22, and only space occupied by thin vanes 22 is lost for high resolution measurements. For ray 26 emerging at angle $\phi$, resolving power of this arrangement is constant over a wide range of $\theta$, and further improves for small angle rays which pass only through the walls of end toroids 10.

In FIG. 2 vaned toroid 12 is supported by central support cylinder 28 at the central radius. This leaves a magnetic volume which is essentially hollow over most of the azimuth. For example, using 72 azimuthal vanes and a central support cylinder, less than 10% of the space is occupied by vanes, and as a result "lost" to high resolution measurements. Allowance for construction tolerances and nitrogen shields reduces magnetic length to about ¾ of dewar length. In this example, self-resolution is better than 3% at 90 degrees and is worse for rays which pass through both central and end toroids.

Figure 3:
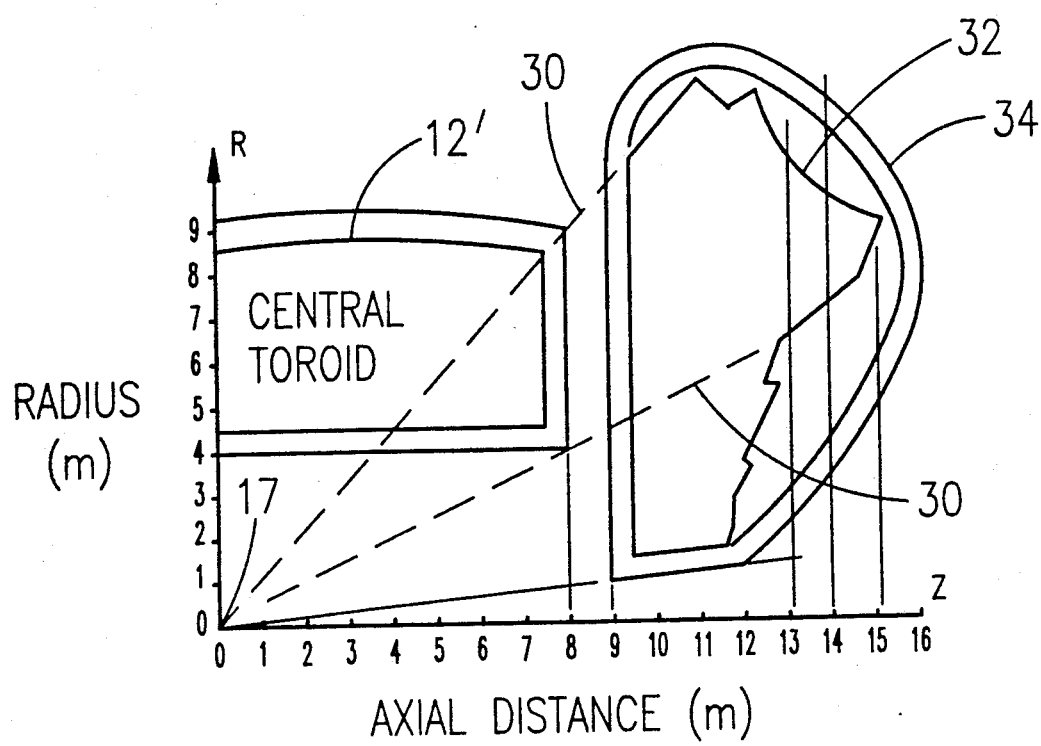
FIG. 3 is a graph depicting the shape of a magnetic volume and enclosing coil which provide constant resolution the entire range of rapidity.

FIG. 3 is a graph depicting the shape of a magnetic volume and enclosing coil which provide constant resolution over a wide range of rapidity. Given central toroid 12' and postulating constant resolution over the entire range, the radiation length for each ray 30 emanating from the intersection point 17 is calculated and plotted as a function of radius and axial distance. Allowance is included for structure as well as gap. Enclosing the end points of each ray 30 yields the shape of the magnetic volume and end toroid 10' shown as line 32. Portions of toroid 10' with straight conductors may be curved to provide the design for enclosing coil 34.

Figure 4:
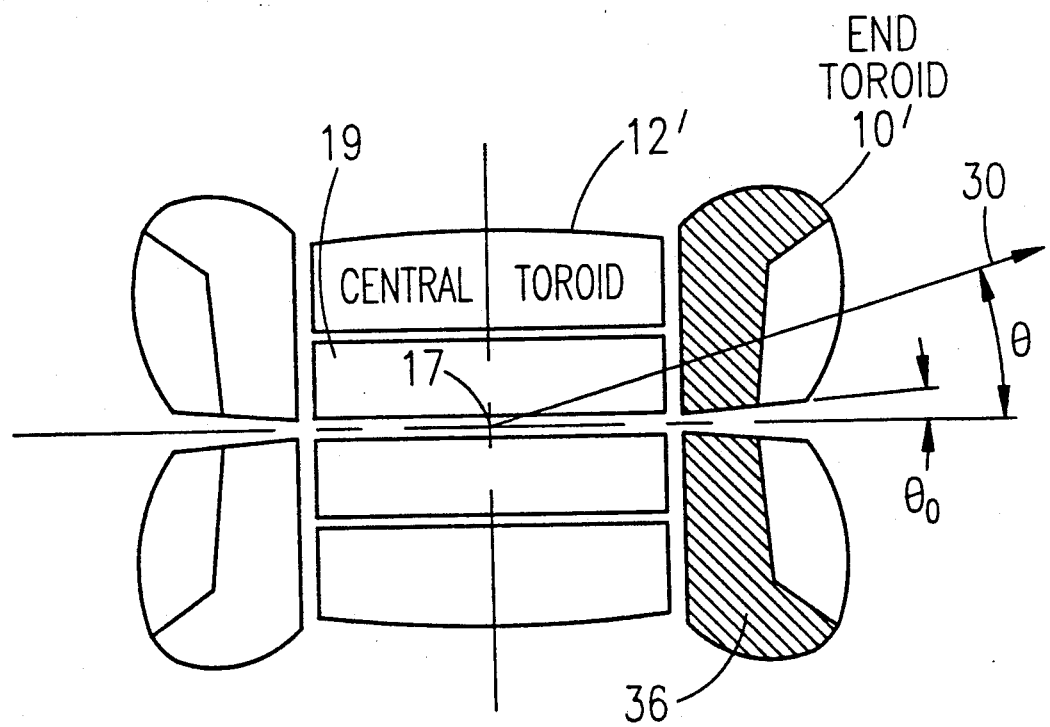
FIG. 4 is a section of a muon detector system including central and end toroids incorporating the shape of FIG. 3.

FIG. 4 is a section of a muon detector system including central and end toroids incorporating the shape of FIG. 3 and enclosing central detector 19. Central toroid 12' is surrounded by end toroids 10' which are shaped to enclose magnetic volume 36 in which resolution will be constant for all rays 30 emanating from intersection point 17 over all angles 8 which are greater than $\theta_o$.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. In a detector system for measuring momenta of particles produced by a proton-proton collision in a high energy accelerator, the improvement comprising an essentially air-core toroidal magnet including sheet structures projecting at regularly spaced azimuthal planes from the inner radius of said toroidal magnet, interconnecting the walls of said toroidal magnet.

2. The toroidal magnet of claim 1 including a central toroidal coil and a plurality of end air-core toroidal coils.

3. The toroidal magnet of claim 2 wherein the outer circumferences of said end toroidal coils are calculated to define a magnetic volume which provides constant resolution for each ray penetrating said central and end toroidal coils.

4. A detector system for measuring momenta of particles produced by a proton-proton collision in a high energy accelerator, including:
   an essentially air-core toroidal magnet,
   detectors located external to the magnetic volume defined by said toroidal magnet, and
   a central support cylinder at the central radius of said air-core toroidal magnet,
   wherein said air-core toroidal magnet includes sheet structures projecting at regularly spaced azimuthal planes from the inner radius of said toroidal magnet, interconnecting the walls of said toroidal magnet.

* * * * *